United States Patent
Kramer et al.

(10) Patent No.: US 11,982,310 B2
(45) Date of Patent: May 14, 2024

(54) BALL JOINT FOR A CHASSIS OF A VEHICLE AND METHOD FOR PRODUCING A BALL JOINT OF THIS KIND

(71) Applicant: ZF Friedrichshafen AG, Friedrichshafen (DE)

(72) Inventors: Thomas Kramer, Oldenburg (DE); Josef Holtheide, Neuenkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 17/600,422

(22) PCT Filed: Mar. 4, 2020

(86) PCT No.: PCT/EP2020/055719
§ 371 (c)(1),
(2) Date: Sep. 30, 2021

(87) PCT Pub. No.: WO2020/200615
PCT Pub. Date: Oct. 8, 2020

(65) Prior Publication Data
US 2022/0170504 A1 Jun. 2, 2022

(30) Foreign Application Priority Data
Apr. 2, 2019 (DE) ...................... 10 2019 204 659.2

(51) Int. Cl.
*F16C 11/06* (2006.01)
*B60G 7/00* (2006.01)

(52) U.S. Cl.
CPC .......... *F16C 11/0642* (2013.01); *B60G 7/005* (2013.01); *F16C 11/0657* (2013.01); *F16C 11/0685* (2013.01)

(58) Field of Classification Search
CPC .............. F16C 11/0619; F16C 11/0623; F16C 11/0628; F16C 11/0633; F16C 11/0638;
(Continued)

(56) References Cited

U.S. PATENT DOCUMENTS 3,554,586 A * 1/1971 Cutler ................. F16C 11/0638
403/140
3,787,127 A * 1/1974 Cutler ................. F16C 11/0638
403/140
(Continued)

FOREIGN PATENT DOCUMENTS

DE 10 2005 005 667 A1 8/2006
DE 102006032838 A1 * 1/2008 ............. B60G 7/005
(Continued)

OTHER PUBLICATIONS

German Action Corresponding to 10 2019 204 659.2 dated May 23, 2019.
(Continued)

*Primary Examiner* — Amber R Anderson
*Assistant Examiner* — Kevin J Baynes
(74) *Attorney, Agent, or Firm* — Finch & Maloney PLLC

(57) ABSTRACT

A ball joint for a chassis of a vehicle. The ball joint has an inner joint portion (2) and a slide bearing (7). The inner joint portion (2) is movably fitted in the slide bearing (7). The ball joint further has a closure element (5) for closing a joint housing. The slide bearing (7) and the closure element (5) are connected to one another. To reduce the number of components and/or the number of assembly steps, the ball joint (1) is characterized in that the slide bearing (7), for the inner joint portion (2), is made as a single, one-piece plastic component (6).

18 Claims, 3 Drawing Sheets

(58) Field of Classification Search
CPC .............. F16C 11/0642; F16C 11/0657; F16C 11/0685; F16C 11/0695; Y10T 403/32737; Y10T 403/32786; Y10T 403/32803; B60G 7/005; B60G 2204/416
See application file for complete search history.

(56) References Cited

U.S. PATENT DOCUMENTS

| | | | | |
|---|---|---|---|---|
| 4,720,205 | A | | 1/1988 | Ito |
| 4,758,110 | A * | 7/1988 | Ito | F16C 33/20 403/140 |
| 4,790,682 | A * | 12/1988 | Henkel | F16C 11/0638 403/135 |
| 5,427,467 | A * | 6/1995 | Sugiura | F16C 11/0685 403/140 |
| 5,611,635 | A * | 3/1997 | Schutt | F16C 11/0642 403/135 |
| 5,676,485 | A * | 10/1997 | Lee | F16C 11/069 403/50 |
| 6,164,861 | A * | 12/2000 | Maughan | F16C 11/0638 403/135 |
| 6,190,080 | B1 * | 2/2001 | Lee | F16C 11/0638 403/135 |
| 6,533,491 | B1 * | 3/2003 | Redele | B62D 7/16 403/138 |
| 6,592,284 | B1 * | 7/2003 | Rechtien | F16C 11/0647 29/898.09 |
| 6,644,671 | B1 * | 11/2003 | Maughan | F16C 11/0671 277/635 |
| 6,736,565 | B2 * | 5/2004 | Tamatsu | F16C 11/0638 29/898.047 |
| 7,063,480 | B2 | 6/2006 | Ersoy et al. | |
| 7,134,801 | B2 * | 11/2006 | Kuroda | B60G 21/0551 403/50 |
| 7,367,742 | B2 * | 5/2008 | Brunneke | F16C 11/0647 403/135 |
| 8,047,739 | B2 * | 11/2011 | Sellers | F16C 11/0628 403/135 |
| 8,376,647 | B2 * | 2/2013 | Kuroda | B60G 7/005 403/134 |
| 8,657,520 | B2 * | 2/2014 | Kuroda | F16C 11/0685 403/135 |
| 8,764,335 | B2 * | 7/2014 | Uehara | B05C 17/0133 401/172 |
| 8,864,155 | B2 * | 10/2014 | Kuroda | F16C 11/0685 29/527.1 |
| 8,905,417 | B2 * | 12/2014 | Kuroda | B60G 7/005 280/124.152 |
| 9,056,538 | B2 * | 6/2015 | Kuroda | F16C 11/06 |
| 9,278,602 | B2 * | 3/2016 | Kuroda | B60G 21/055 |
| 9,291,195 | B1 * | 3/2016 | Parker | F16C 11/068 |
| 9,518,602 | B2 | 12/2016 | Forthaus et al. | |
| 10,119,894 | B2 * | 11/2018 | Holmes | F16C 11/0647 |
| 10,415,633 | B2 * | 9/2019 | Kuroda | F16C 11/0647 |
| 2004/0067096 | A1 * | 4/2004 | Ersoy | B60G 7/005 403/137 |
| 2005/0207830 | A1 * | 9/2005 | Brunneke | F16C 11/0647 403/122 |
| 2006/0029461 | A1 * | 2/2006 | Benick | F16C 11/0647 403/122 |
| 2008/0193207 | A1 * | 8/2008 | Kruse | F16C 11/0647 700/13 |
| 2011/0150563 | A1 * | 6/2011 | Kuroda | F16C 11/0685 29/527.1 |

FOREIGN PATENT DOCUMENTS

| | | | | |
|---|---|---|---|---|
| DE | 102009031738 | A1 * | 1/2011 | ......... F16C 11/0638 |
| DE | 10 2010 005 134 | A1 | 7/2011 | |
| DE | 10 2010 030 246 | A1 | 12/2011 | |
| DE | 10 2016 217 535 | A1 | 9/2017 | |
| EP | 0 231 479 | A2 | 8/1987 | |
| EP | 0 442 602 | A1 | 8/1991 | |
| EP | 3 260 714 | A1 | 12/2017 | |
| JP | 2008-223932 | A | 9/2008 | |
| WO | 03/052284 | A1 | 6/2003 | |
| WO | WO-2011148792 | A1 * | 12/2011 | ......... B60G 21/0551 |
| WO | WO-2016046488 | A1 * | 3/2016 | ............. B60T 11/18 |

OTHER PUBLICATIONS

International Search Report Corresponding to PCT/EP2020/055719 dated Jul. 30, 2020.
Written Opinion Corresponding to PCT/EP2020/055719 dated Jul. 30, 2020.

* cited by examiner

BALL JOINT FOR A CHASSIS OF A VEHICLE AND METHOD FOR PRODUCING A BALL JOINT OF THIS KIND

This application is a National Stage completion of PCT/EP2020/055719 filed Mar. 4, 2020, which claims priority from German patent application serial no. 10 2019 204 659.2 filed Apr. 2, 2019.

FIELD OF TH INVENTION

The invention relates to a ball joint for a chassis of a vehicle, having an inner joint portion and a slide bearing, wherein the inner joint portion fits movably into the slide bearing, and having a closure element for closing a joint housing, wherein the slide bearing and the closure element are connected to one another. In addition, the invention relates to a method for producing a ball joint of this type.

BACKGROUND OF THE INVENTION

Such a ball joint is known from DE 10 2005 005 667 A1. In that case the closure element is designed as a closing ring, which is made from a flat component and an extension in the form of a connection piece projecting from the underside thereof. On the inside, the extension has a section of spherical form with a bearing surface for a joint ball. The bearing surface is made from a low-friction material. In addition, as is usual, this ball joint has a separate ball socket or bearing shell. A slide bearing is formed by the combination of the bearing surface of the extension and the separate bearing shell.

This has the disadvantage that for the formation of the slide bearing, several separate components are necessary. Due to that, several assembly steps are needed, which results in undesirably great complexity and cost. Furthermore, there is an increasing demand to arrange at least one electronic component on a ball joint.

SUMMARY OF THE INVENTION

The purpose of the present invention is to develop further a ball joint and/or a method of the type mentioned to begin with, in such manner that the number of components and/or the number of assembly steps can be reduced. In particular, an alternative embodiment should be provided.

The objective on which the invention is based, is achieved by a ball joint and a method according to the independent claim(s). Preferred further developments of the invention emerge from the subordinate claims and from the description given below.

The ball joint is designed for a chassis of a vehicle, in particular a motor vehicle. Preferably, the ball joint is part of a chassis and/or chassis component. In automotive engineering ball joints are used in many ways. Particularly in the chassis, ball joints serve to articulate chassis components, such as control arm components, wheel carriers, track rods or the like, to one another or to the vehicle body or to an axle support attached thereto.

The ball joint has an inner joint portion. The inner joint portion can for example be in the form of a ball pin or a ball sleeve. In addition, the ball joint comprises a slide bearing. In this case the inner joint portion is fitted movably into the slide bearing. The slide bearing can be made open on at least one side. The slide bearing can be arranged between the inner joint portion and a joint housing, in particular a housing aperture. Preferably, the inner joint portion is in contact with the slide bearing, but is able to move. The ball joint has a closure element for closing the joint housing. In this case there can already be a closure in the sense of the present application, if an opening of the ball joint and/or joint housing is reduced or made smaller by the closure element to the extent that the inner joint portion is held reliably in the slide bearing. In particular, the closure element serves to secure the inner joint portion in the joint housing. Thus, the closure element can prevent the inner joint portion from falling and/or being pulled out of the joint housing up to a specified pull-out force. The slide bearing for the inner joint portion is in the form of a single, one-piece plastic component.

In this case it is advantageous that the slide bearing can be made as a single component. Due to the connection of the closure element to the plastic component that forms the slide bearing, a single component or a hybrid component can be produced, which performs both the function of the slide bearing and also the function of the closure element. In that way the number of individual components and/or the number of assembly steps can be reduced.

Preferably, the ball joint has a joint axis and/or a central longitudinal axis, about which the ball joint and/or its inner joint portion can move. In particular, the joint axis and/or the central longitudinal axis extends in the axial direction of the inner joint portion. The joint axis and/or the central longitudinal axis can coincide. In particular, the ball joint, the slide bearing, the closure element and/or the plastic component are formed rotationally symmetrically or substantially rotationally symmetrically relative to the joint axis and/or the central longitudinal axis. The joint axis and/or the central longitudinal axis can extend through a mid-point of an in particular spherical or ball-shaped joint ball of the inner joint portion.

In the context of the present application, the expression "radial" can characterize any direction which is perpendicular to the axial direction of the ball joint, the joint axis and/or the central longitudinal axis.

In particular, a movable and/or articulated fitting of the inner joint portion in the slide bearing is understood to mean that it can move by swiveling, tilting or rotating. "Tilting" or "pivoting" of the inner joint portion means a movement of the inner joint portion relative to the slide bearing, during which movement an angle enclosed between the joint axis and a housing axis changes. Preferably, the tilting or pivoting takes place about a mid-point of a bearing area, in particular the mid-point of a ball-shaped or spherical section of the inner joint portion, preferably a joint ball of the inner joint portion. In particular, "rotation" or "twisting" of the inner joint portion is understood to mean a movement of the inner joint portion in which the inner joint portion is rotated about the joint axis and/or about the central longitudinal axis, relative to the slide bearing and/or the joint housing. Preferably, an articulated connection does not allow any translational movement of the inner joint portion relative to the slide bearing and/or the joint housing.

According to a further development, to form the slide bearing for the inner joint portion the plastic component has a bearing shell section. In particular, the bearing shell section of the plastic component completely fulfills the function of an otherwise usual separate bearing shell. Preferably, the inner joint portion comprises a joint ball. In particular, the bearing shell section partially encloses and/or surrounds the joint ball of the inner joint portion. In particular, an inner side of the bearing shell section is in contact with an outer side of the joint ball. Correspondingly the bearing shell section, in particular its inner side, conforms in shape to the joint ball, in particular its outer side. Due to the partial enclosure and/or surrounding of the joint ball by the bearing shell section, the inner joint portion or its joint ball is held in the bearing shell section in a form-enclosed manner. Starting from an end and/or pole surface of the joint ball, the bearing shell section can extend in the direction of a joint pin of the inner joint portion beyond an equator of the joint ball.

In a further embodiment the closure element has a plurality of perforations. The material of the plastic component can extend through the perforations of the closure element. In particular, the perforations of the closure element are filled with the material of the plastic component. By virtue of the co-operation of the perforations and the plastic component, a firm and/or form-enclosing connection between the plastic component and the closure element can be produced. In this way the plastic component can be connected simply, reliably and firmly to the closure element. The perforations can be made in the closure element, for example, by a stamping process.

Preferably, the plurality of perforations are arranged in a ring around the closure element. In this case the individual perforations can be in the form of holes or slots. The plurality of perforations can thus be arranged relative to one another in such manner that, overall, a ring-like arrangement is produced. In particular, the ring-like arrangement of the perforations is formed rotationally symmetrically relative to a central longitudinal axis of the ball joint.

In a further development, the plastic component comprises a plurality of in particular web-like contact sections. In particular, the contact sections are in contact with a surface of the closure element. In that way a form-enclosing connection of the plastic component with the closure element can be improved. Preferably, the plurality of contact sections are arranged in a ring around an outside of the plastic component. In particular, the plurality of contact sections are in contact with a surface of the closure element that faces toward the inner joint portion.

According to a further embodiment, the plastic component has a receptacle section for the accommodation of an electronic component. Thus, a single component or a hybrid component formed by the closure element and the plastic component can fulfill at least three functions. These are the function of the closure element, the function of the slide bearing and the function of accommodating an electronic component. Preferably, the receptacle section is arranged in an area facing away from the bearing section. In particular, the closure element is arranged between the bearing shell section and the receptacle section. The area of the plastic component between the bearing section and the receptacle section can be designed as a connection section of the plastic component. In particular, the connection section serves to connect the plastic component to the closure element.

Preferably, the receptacle section, the bearing section and/or the connection section are produced in a single production step during the injection-molding of the plastic component onto the closure element. The electronic component can be held onto the plastic component and/or onto the closure element by means of the receptacle section. The electronic component can be in the form of a sensor element. In particular, the electronic component is in the form of a plug-in connection. Furthermore, the electronic component can be in the form of a chip, a RFID chip or a sensor switching circuit. The electronic component can co-operate with a further electronic component to form a sensor device. For example, the further electronic component can be associated with the inner joint portion. If appropriate, instead of the further electronic component a magnet can be used. By means of an appropriately designed sensor device, for example the position of the inner joint portion in the ball joint can be determined. A corresponding sensor device can be designed as an angle sensor device. The electronic component in the receptacle section can be fully encapsulated in the material of the plastic component. Alternatively, the receptacle section can be designed such that it can co-operate with a further and/or separate holding element to hold the electronic component in place. The further holding element can co-operate with the receptacle section in holding the electronic component in place by virtue of a latched and/or snap-in connection.

The closure element can be in the form of a closing cap or a closing ring. In particular, the closure element is made of metal. In combination with the plastic component, the closure element and the plastic component form a single component. Since it consists of different materials, namely on the one hand that used for the plastic component and on the other hand that used for the closure element, the component is in the form of a hybrid component.

Preferably, the inner joint portion is in the form of a ball pin. In the ball pin version the inner joint portion comprises a joint ball and a joint pin. In particular, the joint pin of the inner joint portion extends out of an opening of the bearing shell section. Preferably, the opening of the bearing shell section allows the articulated mobility of the inner joint portion in the slide bearing or the bearing shell section. At the same time, the diameter of the opening can determine or define a maximum tilt angle of the inner joint portion relative to the central longitudinal axis of the ball joint.

In a further development, an edge of the closure element projects beyond the plastic component. In particular, the edge of the closure element projects beyond the plastic component radially relative to the central longitudinal axis of the ball joint. Preferably, the edge is designed to hold the closure element onto the joint housing. In particular, the projecting and/or outstanding edge of the closure element is not covered by the material of the plastic component. Thus, the edge can be directly in contact with the joint housing in order to connect the closure element to the joint housing. For example, the edge of the closure element can be fitted and/or adhesively bonded into a holding groove of the joint housing. The holding groove of the joint housing can be formed by a deformation process. The edge of the closure element can be of annular design.

Particularly advantageous is a method for producing a ball joint according to the invention, in which an integral slide bearing for the inner joint portion is made in one piece from a single plastic component. To produce the ball joint according to the invention, the inner joint portion and the closure element are placed in an injection-molding die. Then, a plastic material is injection-molded to form the plastic component. Thereby, on the one hand the bearing shell section for the articulated accommodation of the joint ball of the inner joint portion can be formed, and on the other hand a firm connection of the plastic component to the closure element can be produced. In particular, during injection-molding the material of the plastic component passes into and through several perforations of the closure element. Preferably, the receptacle section for accommodating an electronic component is formed at the same time. Thus, after the material of the plastic component has hardened a single component is formed, which includes the inner joint portion, the closure element and the plastic component. This component can then be inserted into the joint housing. In particular, the closure element is fixed onto the joint housing. To do this, for example an edge of the joint housing can be rolled over the edge of the closure element.

BRIEF DESCRIPTION OF THE DRAWINGS

Below, the invention is explained in greater detail with reference to the figures. In the figures, the same indexes denote the same, similar or functionally equivalent components. The figures show.

DETAILED DESCRIPTION OF THE PREFERRED EMBODIMENTS

Figure 1:
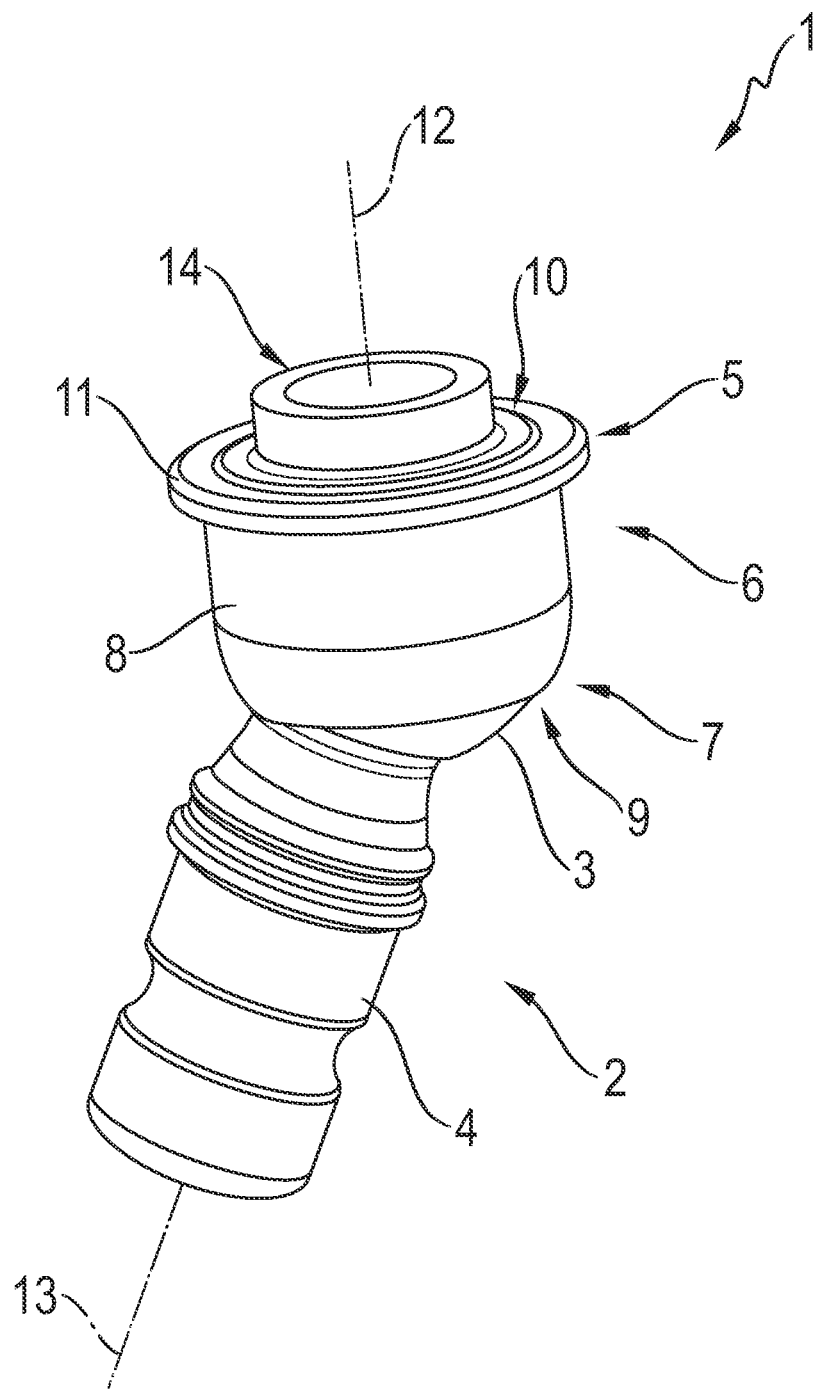
FIG. 1: A perspective side view of a ball joint according to the invention.

FIG. 1 shows a perspective side view of a ball joint 1 according to the invention. The ball joint 1 comprises an inner joint portion 2. In this example embodiment, the inner joint portion 2 is in the form of a ball pin. For this, the inner joint portion 2 comprises a joint ball 3 and a joint pin 4. In addition, the ball joint 1 has a closure element 5. In this example embodiment the closure element 5 and the inner joint portion 2 are made of a metal.

In addition the ball joint 1 has a plastic component 6. As explained in the figures below, the plastic component 6 is connected firmly to the closure element 5, The plastic component 6 forms a slide bearing 7 for the inner joint portion 2. In this case the slide bearing 7 is formed exclusively by the one-piece plastic component 6.

In detail, to form the slide bearing 7 for the inner joint portion 2 or the joint ball 3, the plastic component 6 has a bearing shell section 8. The bearing shell section 8 encloses or surrounds the joint ball 3 of the inner joint portion 2. In that way the inner joint portion 2 is held so that it can pivot and rotate in the bearing shell section 8. At least the ball pin 4 of the inner joint portion 2 extends outward through an opening of the bearing shell section 8. The opening 9 is located on a side of the bearing shell section 8 that faces away from the closure element 5. In the area of the closure element 5 the plastic component 6 extends at least partially through the closure element 5 to form a form-enclosing connection. In the area of the closure element 5 the plastic component 6 forms a connection section 10. By means of this connection section 10 the plastic component 6 is connected to the closure element 5 firmly and in particular in a form-enclosed manner.

The closure element 5 has an edge 11. The edge 11 of the closure element 5 is not covered by the material of the plastic component 6. Furthermore, relative to a central longitudinal axis 12 of the ball joint 1, the edge 11 extends radially outward beyond the plastic component 6 and the bearing shell section 8. By means of the edge 11 the ball joint 1 can be fixed into a joint housing (not shown). In particular, a joint housing can be closed by the closure element 5 in co-operation with the edge 11.

In this example embodiment the plastic component 6 and the closure element 5 are formed rotationally symmetrically relative to the central longitudinal axis 12. The inner joint portion 2 has a joint axis 13. In the illustration, the inner joint portion 2 with the joint axis 13 is shown tilted relative to the central longitudinal axis 12. In a neutral starting position, the central longitudinal axis 13 and the joint axis 12 can coincide. The inner joint portion 2 is formed rotationally symmetrically relative to the joint axis 13.

In this example embodiment, the plastic component 6 has a receptacle section 14 for accommodating an electronic component (not shown here). The receptacle section 14 is located in an area facing away from the bearing shell section 8. The closure element 5 or the connection section 10 is located between the bearing shell section 8 and the receptacle section 14. Purely in the sense of a place-holder, the receptacle section 14 is shown as a ring. In fact, the receptacle section 14 can be designed as necessary to accommodate an electronic component, such as a sensor element.

In this example embodiment the plastic component 6 fulfills at least three functions. First, the plastic component 6 with the bearing shell section 8 provides the complete slide bearing 7 for the joint ball 3. In addition, by virtue of the connection section 10 the plastic component 6 enables a firm connection to the closure element 5. Finally, by virtue of the receptacle section 14 the plastic component 6 provides accommodation for an electronic component.

Figure 2:
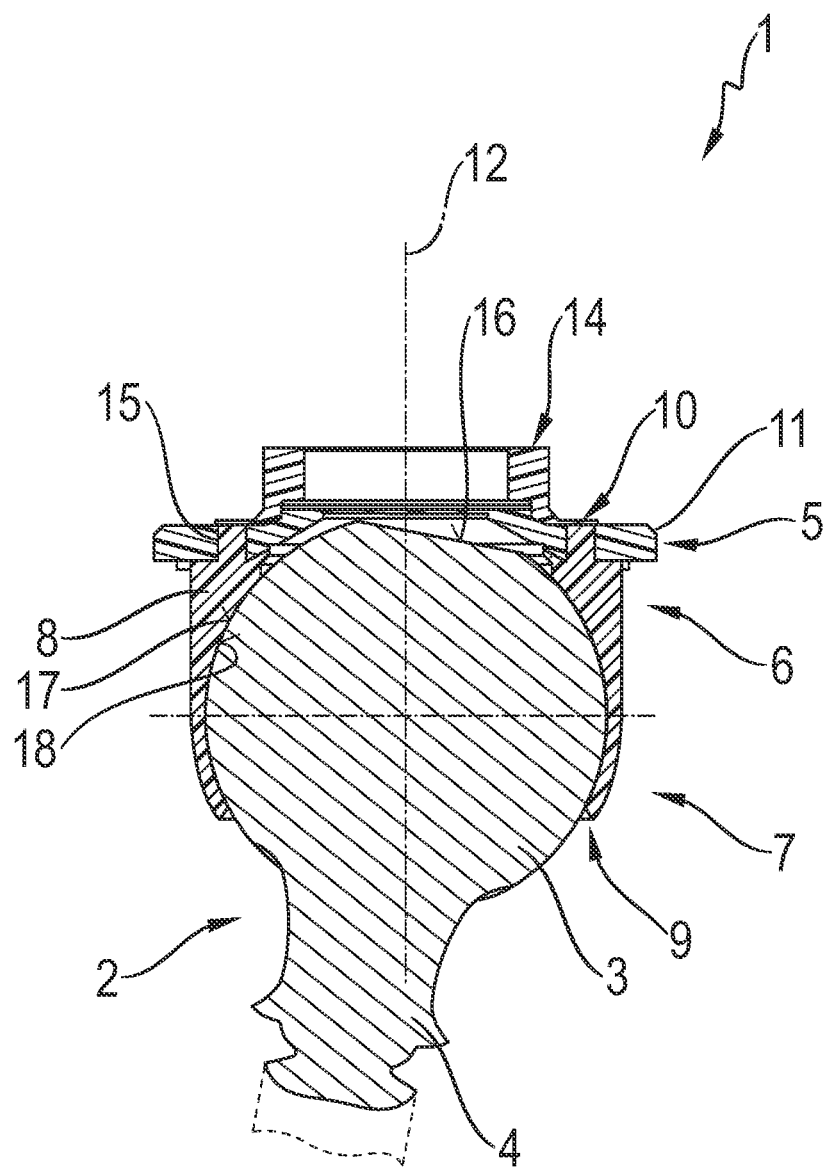
FIG. 2: Part of a sectioned side view of the ball joint according to the invention shown in FIG. 1, and FIG. 3: Part of a further perspective view of the ball joint according to the invention shown in FIGS. 1 and 2.

FIG. 2 shows part of a sectioned side view of the ball joint 1 according to FIG. 1. In this example embodiment the closure element 5 is in the form of a closing cap. The closure element 5 has a plurality of perforations 15. The material of the plastic component 6 extends through the perforations 15 and completely fills them. By virtue of the co-operation of the perforations 15 and the plastic component 6, a firm and form-enclosed connection is made between the plastic component 6 and the closure element 5. At the same time, the connection section 10 of the plastic component 6 is formed by this.

In this example embodiment the inner joint portion 2 has a pole surface 16 on a side facing away from the joint pin 4. Except for the pole surface 16, an outside 17 of the joint ball 3 is in contact with an inside 18 of the bearing shell section 8. For this, the outside 17 and the inside 18 are designed to conform in shape to one another.

Figure 3:
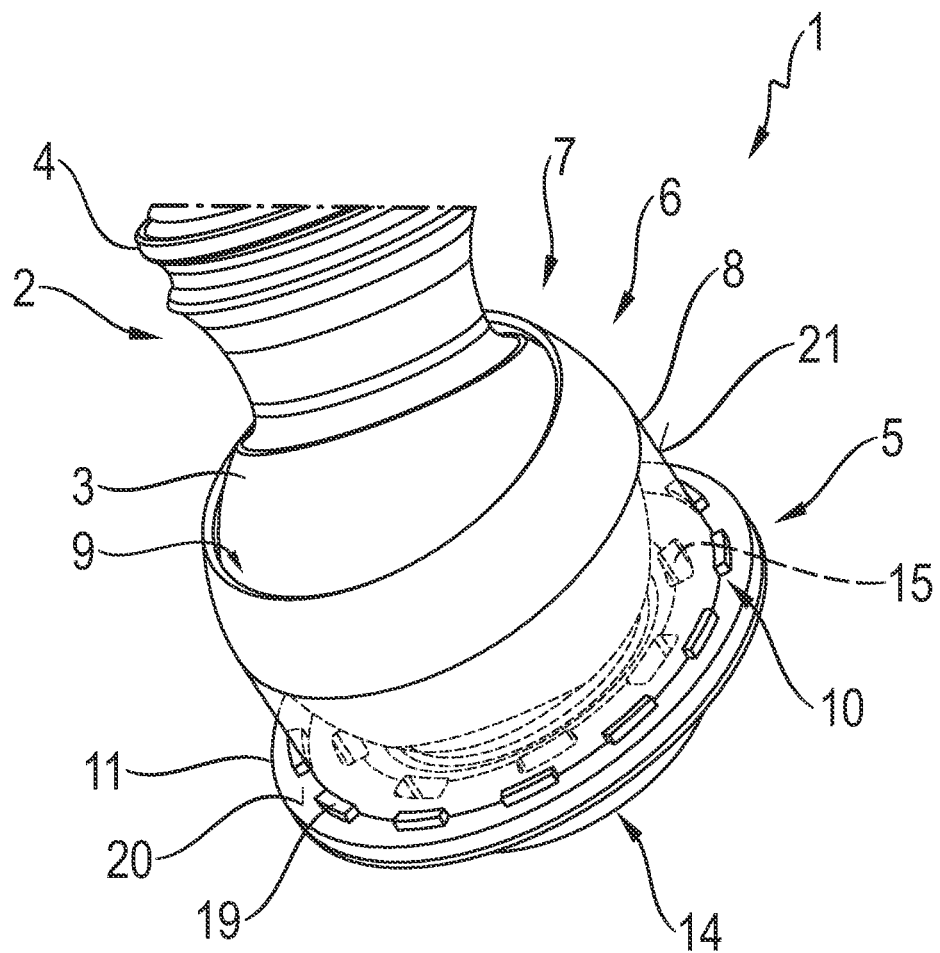

FIG. 3 shows a further perspective view of the ball joint 1 according to the invention shown in FIGS. 1 and 2. In this case part of the bearing shell section 8 is represented as translucent or transparent. This allows several of the perforations 15 in the closure element 5 to be seen clearly. The perforations 15 are arranged in a ring around the closure element 5. In this example embodiment the perforations 15 are in the form of slots. For the sake of clarity, not all the perforations 15 are indexed.

In this example embodiment the plastic component 6 has a plurality of contact sections 19. Here, the contact sections 19 are web-like. For greater clarity, not all the contact sections 19 are indexed. The contact sections 19 rest against a surface 20 of the closure element 5. The surface 20 of the closure element 5 faces toward the inner joint portion 2. The plurality of contact sections 19 are arranged in a ring around an outside 21 of the plastic component 6. In particular, the contact sections 19 are arranged in the area of the connection section 10 or in a transition zone between the bearing shell section 8 and the connection section 10.

INDEXES

1 Ball joint
2 Inner joint portion
3 Joint ball
4 Joint pin
5 Closure element
6 Plastic component 7 Slide bearing
8 Bearing shell section
9 Opening
10 Connection section
11 Edge
12 Central longitudinal axis
13 Joint axis
14 Receptacle section
15 Perforation
16 Pole surface
17 Outer side
18 Inner side
19 Contact section
20 Surface
21 Outer side

The invention claimed is:

1. A ball joint for a chassis of a vehicle, the ball joint comprising:
an inner joint portion,
a slide bearing,
the inner joint portion being movably fitted in the slide bearing,
a closure element for closing a joint housing,
the slide bearing and the closure element being connected to one another,
the slide bearing, for the inner joint portion, being made as a single, one-piece plastic component, the plastic component defining a central longitudinal axis of the ball joint and having a radially outer surface, the plastic component having a first opening at an axial end facing the closure element and a second opening located on a side facing away from the closure element, and the first and the second openings both being aligned with the central longitudinal axis,
a central opening of the closure element also being aligned with the central longitudinal axis to facilitate communication with an electronic component,
the plastic component having a cylindrical receptacle section, configured to accommodate the electronic component within a recess portion of the receptacle section, and a bearing shell section, facing the inner joint portion, and
the receptacle section extending away from the closure element and the inner joint portion such that the closure element being arranged between the bearing shell section and the receptacle section.

2. The ball joint according to claim 1, wherein the bearing shell section at least one of partially encloses and surrounds a joint ball of the inner joint portion.

3. The ball joint according to claim 1, wherein the closure element has a plurality of perforations, through which material of the plastic component extends and/or which are filled with the material of the plastic component, and the plurality of perforations being arranged in the closure element radially between the central opening of the closure element and an outer edge of the closure element, and
by virtue of co-operation of the plurality of perforations and the plastic component, at least one of a firm connection and a form-enclosed connection is formed between the plastic component and the closure element.

4. The ball joint according to claim 3, wherein the plurality of perforations are arranged in a ring in the closure element, and
the plurality of perforations are in a form of at least one of holes and slots.

5. The ball joint according to claim 1, wherein the plastic component comprises a plurality of web-like contact sections, and
the plurality of web-like contact sections extend radially from the outer surface of the plastic component and are arranged in a ring around the outer surface of the plastic component and in contact with a surface of the closure element that faces toward the inner joint portion.

6. The ball joint according to claim 1, wherein the receptacle section and the bearing shell section of the plastic component are open to each other along the central longitudinal axis.

7. The ball joint according to claim 1, wherein the closure element is in a form of either a closing cap or a closing ring and is made of a metal, and
the inner joint portion is in a form of a ball pin.

8. The ball joint according to claim 1, wherein an edge of the closure element projects beyond the plastic component, radially relative to the central longitudinal axis of the ball joint, and
the edge is designed to hold the closure element on the joint housing.

9. A method for producing a ball joint for a chassis of a vehicle, the ball joint comprises an inner joint portion and a slide bearing, the inner joint portion is movably fitted in the slide bearing, a closure element is provided for closing a joint housing, and the slide bearing and the closure element are connected to one another, the method comprising:
making the slide bearing for the inner joint portion as an integral one-piece slide bearing from a single plastic component,
forming the single plastic component to have a first opening at an axial end facing the closure element and a second opening located on a side of the slide bearing facing away from the closure element so that both the first and the second openings are aligned with a central longitudinal axis of the ball joint,
aligning a central opening of the closure element with the central longitudinal axis to facilitate communication with an electronic component,
forming the plastic component integral with a cylindrical receptacle section and a bearing shell section,
configuring the receptacle section to accommodate the electronic component, within a recess portion of the receptacle section, and arranging the bearing shell section to face the inner joint portion,
extending the receptacle section away from the closure element and the inner joint portion such that the closure element is arranged between the bearing shell section and the receptacle section.

10. The method according to claim 9, further comprising at least one of
making the plastic component by an injection-molding process, and
inserting the inner joint portion, the closure element and the plastic component into the joint housing to fix the closure element on the joint housing.

11. A ball joint for a chassis of a vehicle, the ball joint comprising:
an inner joint portion,
a slide bearing,
the inner joint portion being movably fitted in the slide bearing,
a closure element for closing a joint housing,
the slide bearing, for the inner joint portion, and a cylindrical receptacle section, configured to accommodate an electronic component, both being integrally formed together and made as a single, one-piece plastic component, the plastic component defining a central longitudinal axis of the ball joint and having a radially outer surface and a bearing shell section, the plastic component being connected to the closure element, the plastic component having a first opening at an axial end facing the closure element and a second opening of the plastic component, facing away from the closure element, and the first and second openings both being aligned with the central longitudinal axis, the closure element having a central opening extending therethrough along the central longitudinal axis, and the receptacle section being located adjacent the central opening of the closure element but on a side of the closure element opposite the bearing shell section such that the central opening of the closure element being located between and separating the receptacle section and the slide bearing.

12. The ball joint according to claim 11, wherein the bearing shell section at least one of partially encloses and surrounds a joint ball of the inner joint portion.

13. The ball joint according to claim 11, wherein the closure element has a plurality of perforations, through which material of the plastic component extends and/or which are filled with the material of the plastic component, the plurality of perforations are arranged in the closure element radially between the central opening of the closure element and an outer edge of the closure element, and by virtue of co-operation of the plurality of perforations and the plastic component, at least one of a firm connection and a form-enclosed connection is formed between the plastic component and the closure element.

14. The ball joint according to claim 13, wherein the plurality of perforations are arranged in a ring in the closure element, and the plurality of perforations are in a form of at least one of holes and slots.

15. The ball joint according to claim 11, wherein the plastic component comprises a plurality of web-like contact sections, and the plurality of web-like contact sections extend radially from the outer surface of the plastic component and are arranged in a ring around the outer surface of the plastic component and in contact with a surface of the closure element that faces toward the inner joint portion.

16. The ball joint according to claim 11, wherein the receptacle section and the bearing shell section of the plastic component are open to each other along the central longitudinal axis.

17. The ball joint according to claim 11, wherein the closure element is in a form of either a closing cap or a closing ring and is made of a metal, and the inner joint portion is in a form of a ball pin.

18. The ball joint according to claim 11, wherein an edge of the closure element projects beyond the plastic component, radially relative to the central longitudinal axis of the ball joint, and the edge is designed to hold the closure element on the joint housing.

* * * * *